Aug. 13, 1935.  J. ROHAN  2,011,375
APPARATUS FOR WASHING MOTOR CARS AND THE LIKE
Filed Nov. 4, 1933
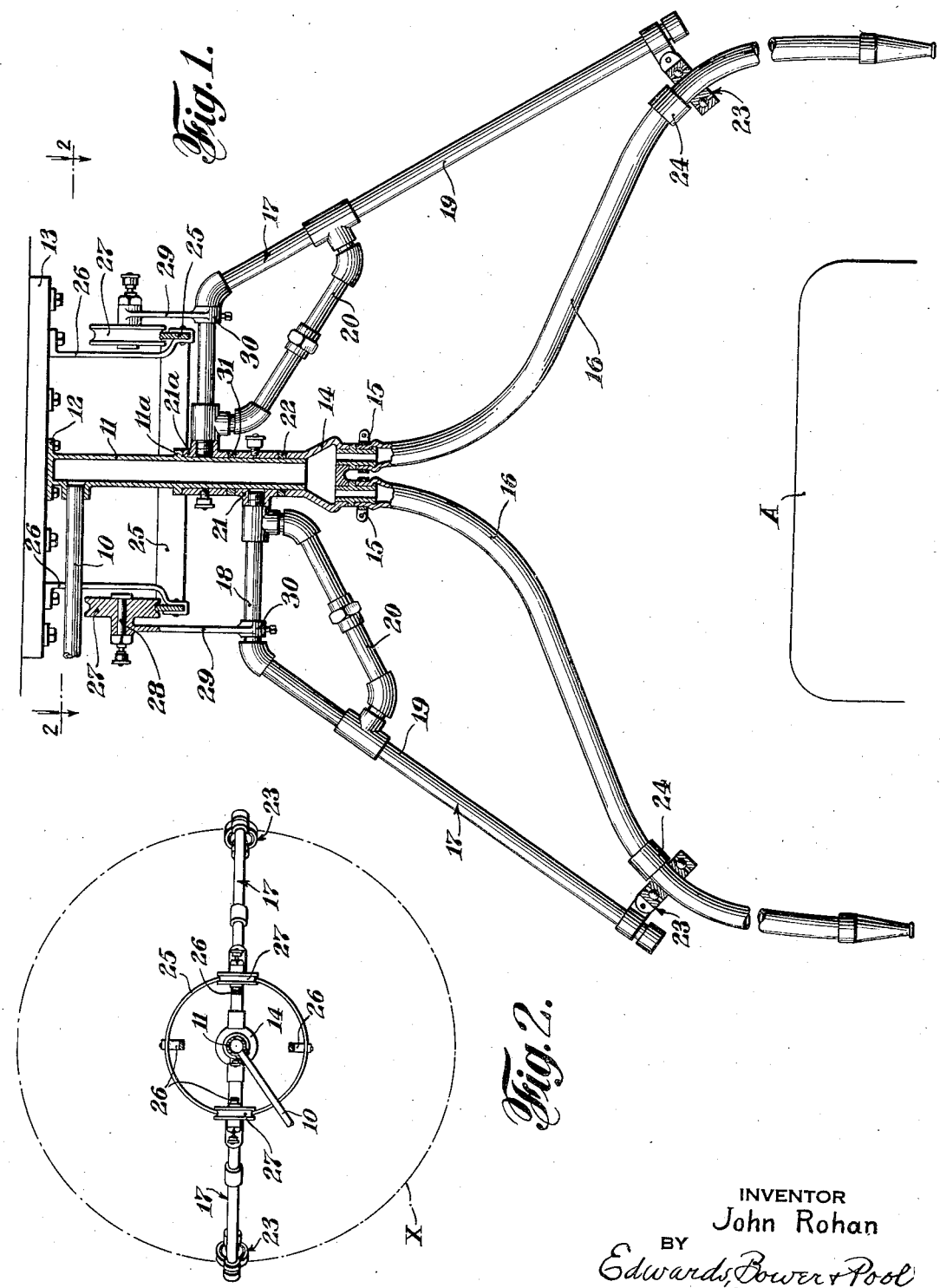
INVENTOR
John Rohan
BY
Edwards, Bower & Pool
ATTORNEYS Patented Aug. 13, 1935

2,011,375

UNITED STATES PATENT OFFICE 2,011,375

APPARATUS FOR WASHING MOTOR CARS AND THE LIKE

John Rohan, New York, N. Y.

Application November 4, 1933, Serial No. 696,631

2 Claims. (Cl. 299—81)

My invention relates to apparatus for washing motor cars and the like, and has for its general object to provide a new and improved apparatus of the class specified whereby the defects usually found in such appliances are done away with. In prior constructions and particularly those making use of high water pressure, 350 pounds or more, as is common, there has usually been employed a hose connection having a swivel joint at the point of connection between the water supply pipe and the flexible hose to enable the nozzle or discharge end of the hose to move in a substantially circular path around the vehicle to be washed. Such joints are expensive to make and difficult to keep in repair, being liable to leakage necessitating lengthy shutdowns. Moreover, when they are made tight enough to prevent leakage the free rotary movement of the joints is restricted. By the present invention swivel joints and other movable joints subject to leakage are eliminated; and furthermore, the liability of the hose to twist, bind and kink is avoided. Also it is an essential that the apparatus be operated with as little physical effort as possible so as to be within the powers of a single operator, and the present invention requires a minimum of physical effort.

The preferred embodiment of the invention illustrated in the accompanying drawing is comparatively simple and cheap of manufacture, is not subject to leakage, has required in actual practice little or no repair, and can be readily operated and manipulated by the user.

In the drawing, Fig. 1 is a fragmentary vertical elevation of an apparatus embodying the invention, and Fig. 2 is a horizontal sectional view on a plane indicated by the section line 2—2 in Fig. 1.

Referring to the drawing, 10 designates a water inlet pipe or main which opens into the top portion of a vertical supply pipe or water-conducting chamber 11, the upper end terminating in a flanged closure 12 which is suitably fixed to a ceiling beam of the garage or other stationary support 13. The water supply is or may be at high pressure, of say three hundred and fifty pounds, more or less. Threaded on or otherwise secured to the lower open end of the pipe 11 is a hose connection 14, to the lower end of which is firmly secured by suitable devices indicated generally at 15 the upper open ends of one or more flexible hoses 16, two of such hoses being shown in the present instance. It is to be understood that while the drawing illustrates a so-called Siamese connection for two flexible water hoses, one or any suitable number of such hoses may be employed within the scope of the invention.

Means are provided for affording movement of the hose 16 in circular path about the vehicle to be washed, the term "circular path" being intended to comprehend an arcuate or other curved path less, if desired, than a complete circle. Such means comprises a hose carrier which, as herein shown, is a rigid frame designated generally as 17, and preferably made of sections or parts of hollow metal tubing with unions or joints as shown, such tubing having been found in practice to combine lightness and rigidity of structure. The detailed construction of the carrier or frame may be varied as found desirable but shown herein comprises generally a horizontal arm 18 from which inclines angularly downward and outward a long extension 19 of tubing, the arms 18 and 19 being connected by a cross brace 20. To the inner end of the arm 18 of the carrier is secured a bearing member 21 which loosely surrounds and bears rotatively on the supply pipe 11, the bearing member 21 being preferably spaced from the connection 14 by a washer 22.

To the lower end of arm 19 is secured a ball bearing member 23 of suitable construction through which the hose 16 passes at some distance below and outward from its point of connection with the source of water supply. The hose passes smoothly through the roller or ball bearing 23 at substantially right angles to the plane of the ball race or without angularity, thus preventing binding and wear, the rollers or balls affording easy frictionless turning movements during rotation of the carrier. Above the member 23 the hose is provided with a stop 24 which cooperates with the member to limit downward movement of the hose through the member and also relieves strain or pull at the connection 15. It will be noted that the means or devices 23 and 24 cooperate to retain the upper portion of the hose 16 in a gentle easy curve which is maintained substantially without variation at all times during the operation of the apparatus. The parts are so constructed and arranged that the device 23 in all positions in its path, indicated at X in Fig. 2, fully clears the vehicle to be washed, being well above its top and also located outward beyond its sides, thus preventing contact of the apparatus and of the hose with the vehicle without attention from the operator.

Means are provided for supporting the carrier 17 independently of the central support or pipe 11 and at the same time assisting to guide the carrier in and restrict it to a circular path. Such means in the present instance comprise a stationary circular bar or trackway 25 carried by a plurality of hangers 26 secured to the stationary support 13. The trackway receives a rotary bearing member in the form of a grooved wheel or pulley 27 from the axle 28 of which is suspended an arm 29 having an eye 30 at its lower end which embraces the arm 18 of the hose carrier and is rigidly secured thereto. The pulley 27 and its arm 29 assist to provide a support for the hose carrier 17 and the hose and permit them to be readily turned or rotated, the pulley running over the trackway 25 during rotary movements. The parts are so arranged that the weight of the carrier 17 is suitably balanced or distributed. Any tendency of the carrier to tip will of course be prevented by the bearing 21.

The description hereinbefore given of one carrier and associate parts applies, of course, to the corresponding duplicate shown herein, it being only necessary to note that the bearing member 21a of the right hand carrier 17 is disposed above the corresponding bearing member 21 at the left, and that upward sliding movement is limited by the flange 11a of the pipe 11. Preferably a suitable washer 31 is interposed between the two bearing members 21 and 21a.

In operation, the water having been turned on, the user grasping the nozzle end portion of the hose moves to desired positions during the washing of the vehicle, diagrammatically illustrated at A, located substantially in a central position beneath the vertical supply pipe. No action is required by the user other than the washing operation itself, the novel apparatus causing the hose to follow readily the operator's movements without attention from him or physical effort on his part beyond the slight pull necessary to move the carrier on its trackway. In all positions the hose is in substantially the arrangement shown in the drawing, the movement being unrestricted, since twisting, binding, bending or kinking of the hose is obviated. The nice balancing of the carrier and its spaced, independent bearings assist in reducing to a minimum the physical effort required in moving it during operation.

Various changes may be made without departing from the spirit and scope of the invention.

I claim:

1. In apparatus for washing motor cars and the like under high pressure, the combination of a source of water supply, a flexible hose fixedly connected at one end to said source of supply, a rigid rotary frame carrying said hose, a bearing secured to the lower end portion of said frame and through which the hose passes, and a stop on said hose and movable therewith above said bearing, said stop coacting with said bearing for positively maintaining the upper portion of the hose in a substantially unvarying curve.

2. In apparatus of the class described the combination of a source of a water supply including a vertical stationary pipe, a hose coupling rigid with the lower end of said pipe, a flexible hose connecting directly to said coupling at one end and having directly connected to its other end a fluid-emitting nozzle, a movable frame, a bearing for supporting said hose from the frame, stop means on the hose, a circular trackway coaxial with said vertical pipe, a roller member bearing on said trackway and an arm carried by said roller member and connected to said frame, said frame also being supported directly from said stationary pipe independently of said hose.

JOHN ROHAN.